US008902720B1

(12) United States Patent
Schreck et al.

(10) Patent No.: US 8,902,720 B1
(45) Date of Patent: Dec. 2, 2014

(54) HEAT-ASSISTED MAGNETIC RECORDING (HAMR) WRITE HEAD WITH PROTECTIVE FILM FOR NEAR-FIELD TRANSDUCER

(71) Applicant: HGST Netherlands B.V., Amsterdam (NL)

(72) Inventors: Erhard Schreck, San Jose, CA (US); Matteo Staffaroni, Pleasanton, CA (US); Barry Cushing Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/255,088

(22) Filed: Apr. 17, 2014

(51) Int. Cl.
*G11B 11/00* (2006.01)
(52) U.S. Cl.
USPC ............... 369/13.33; 369/13.13; 369/112.27
(58) Field of Classification Search
USPC .......... 369/13.33, 13.32, 13.24, 13.14, 13.03, 369/13.12, 13.13, 13.22, 13.01, 13.35, 369/112.27; 360/59, 125.31, 125.74
See application file for complete search history.

(56) References Cited

U.S. PATENT DOCUMENTS

| 6,524,687 | B2 | 2/2003 | Horng et al. |
| 7,508,632 | B2 | 3/2009 | Li et al. |
| 7,518,815 | B2 | 4/2009 | Rottmayer et al. |
| 8,194,512 | B2 * | 6/2012 | Stipe .......................... 369/13.33 |
| 8,705,325 | B2 * | 4/2014 | Matsumoto ................ 369/13.33 |
| 8,705,327 | B2 * | 4/2014 | Matsumoto ................ 369/30.03 |
| 2003/0228497 | A1 | 12/2003 | Howard et al. |
| 2011/0096639 | A1 | 4/2011 | Matsumoto |
| 2011/0170381 | A1 | 7/2011 | Matsumoto |

* cited by examiner

*Primary Examiner* — Ali Neyzari
(74) *Attorney, Agent, or Firm* — Thomas R. Berthold

(57) ABSTRACT

A heat-assisted magnetic recording (HAMR) head has a protective film confined to a window of the disk-facing surface of the slider than surrounds the near-field transducer (NFT) and write pole end. Materials for the protective film include $TiO_2$, $ZrO_2$, $HfO_2$, $Nb_2O_5$, $Ta_2O_5$, $Sc_2O_3$, $Y_2O_3$, MgO SiN, BN, SiBN and SiBNC. The slider overcoat is located in the non-window region on the slider's disk-facing surface and optionally also on the window region, with the outer surface of the overcoat forming the slider's ABS. An optional recess may be formed on the disk-facing surface of the slider in the window region, with the protective film located in the recess.

20 Claims, 7 Drawing Sheets

HEAT-ASSISTED MAGNETIC RECORDING (HAMR) WRITE HEAD WITH PROTECTIVE FILM FOR NEAR-FIELD TRANSDUCER

TECHNICAL FIELD

This invention relates generally to a heat-assisted magnetic recording (HAMR) disk drive, in which data are written while the magnetic recording layer on the disk is at an elevated temperature, and more specifically to an improved HAMR write head.

BACKGROUND OF THE INVENTION

In conventional magnetic recording, thermal instabilities of the stored magnetization in the recording media can cause loss of recorded data. To avoid this, media with high magnetocrystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

In a typical HAMR write head, light from a laser diode is coupled to a waveguide that guides the light to a near-field transducer (NFT) (also known as a plasmonic antenna). A "near-field" transducer refers to "near-field optics", wherein the passage of light is through an element with subwavelength features and the light is coupled to a second element, such as a substrate like a magnetic recording medium, located a sub-wavelength distance from the first element. The NFT is typically located at the air-bearing surface (ABS) of the air-bearing slider that also supports the read head and magnetic write pole and rides or "files" above the disk surface. NFTs are typically formed of a low-loss metal (e.g., Au, Ag, Al, Cu) shaped in such a way to concentrate surface charge motion at a notch or tip located at the slider ABS when light is incident. Oscillating tip charge creates an intense near-field pattern that heats the recording layer on the disk. The magnetic write pole is then used to change the magnetization of the recording layer while it cools. Sometimes, the metal structure of the NFT can create resonant charge motion (surface plasmons) to further increase intensity and disk heating. For example, when polarized light is aligned with an E-antenna type of NFT, an intense near field pattern is created at the notch or tip of the E-antenna. Resonant charge motion can occur by adjusting the E-antenna dimensions to match a surface plasmon frequency to the incident light frequency. A NFT with a generally triangular output end, sometimes called a "nano-beak" type of NFT, is described in US 2011/0096639 and US 2011/0170381, both assigned to the same assignee as this application. In this type of NFT an evanescent wave generated at a surface of the waveguide couples to surface plasmons excited on the surface of the NFT and a strong optical near-field is generated at the apex of the triangular output end.

As part of the development of this invention, it has been discovered that the reliability of the NFT is much worse under actual recording conditions on a disk than under similar optical power in vacuum or ambient air conditions. This may be due to degradation or oxidation of the slider's protective overcoat, which is formed of amorphous diamond-like carbon (DLC). It may also be due to "back-heating" of the NFT as a result of slider-disk frictional heating, conduction from the disk and/or the accumulation of carbonaceous material near the NFT. Back-heating, i.e., heating of the NFT in addition to the normal optical heating from the laser radiation, can cause diffusion of the NFT metal until the NFT tip rounds and recording degrades.

What is needed is a HAMR head that is not impacted by degradation of the slider's DLC overcoat and which is protected from back-heating.

SUMMARY OF THE INVENTION

Embodiments of this invention relate to a HAMR head with a protective film confined to a window of the disk-facing surface of the slider than surrounds the NFT end and write pole end. The protective film prevents back-heating of the NFT. The protective film is formed of a material transparent to radiation at the wavelength of the laser and has a high index of refraction and low thermal conductivity and is resistant to degradation or corrosion at high temperature and in the presence of oxygen and water. The protective film material is also not comprised primarily of diamond-like carbon (DLC) as this material is not particularly stable at high temperature and in the presence of oxygen. Materials for the protective film include, but are not limited to, $TiO_2$, $ZrO_2$, $HfO_2$, $Nb_2O_5$, $Ta_2O_5$, $Sc_2O_3$, $Y_2O_3$, MgO, SiN, BN, SiBN, SiBNC, with the preferred material being one of $TiO_2$, $ZrO_2$, $HfO_2$, or SiBN.

The slider overcoat, which is typically amorphous diamond-like carbon (DLC), is located in the non-window region on the slider's disk-facing surface and optionally also on the window region, with the outer surface of the overcoat forming the slider's ABS. In one embodiment the slider overcoat is located over the protective film. In another embodiment the slider overcoat is located directly on the NFT and write pole end in the window region, with the protective film located on the overcoat in the window region. An optional recess may be formed on the disk-facing surface in the window region, with the protective film located in the recess.

For a fuller understanding of the nature and advantages of the present invention, reference should be made to the following detailed description taken together with the accompanying figures.

DETAILED DESCRIPTION OF THE INVENTION

Figure 1:
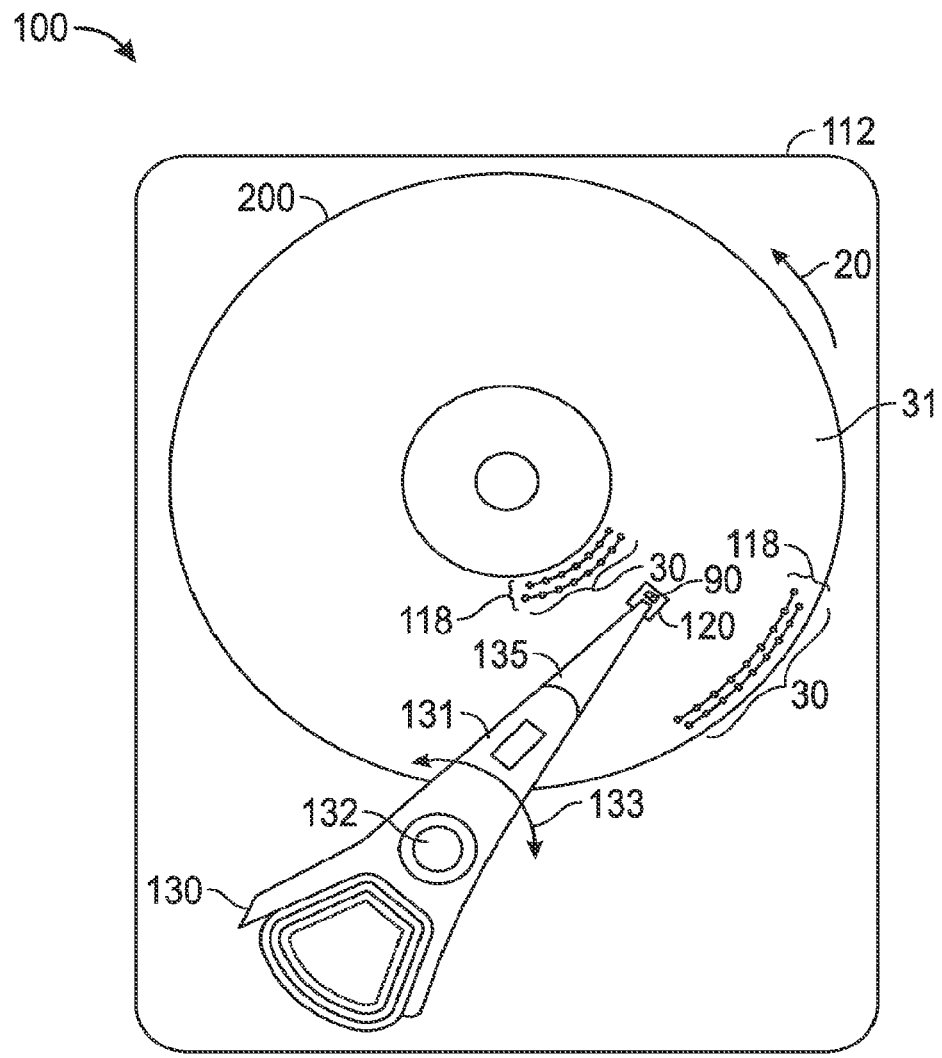
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with the magnetic recording layer 31 patterned into discrete data islands 30 of magnetizable material arranged in radially-spaced circular tracks 118. Only a few representative islands 30 and representative tracks 118 near the inner and outer diameters of disk 200 are shown. However, instead of the bit-patterned-media (BPM) shown with discrete data islands 30 in FIG. 1, the HAMR disk drive may instead use disks in which the recording layer 31 is a conventional continuous magnetic recording layer of magnetizable material.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
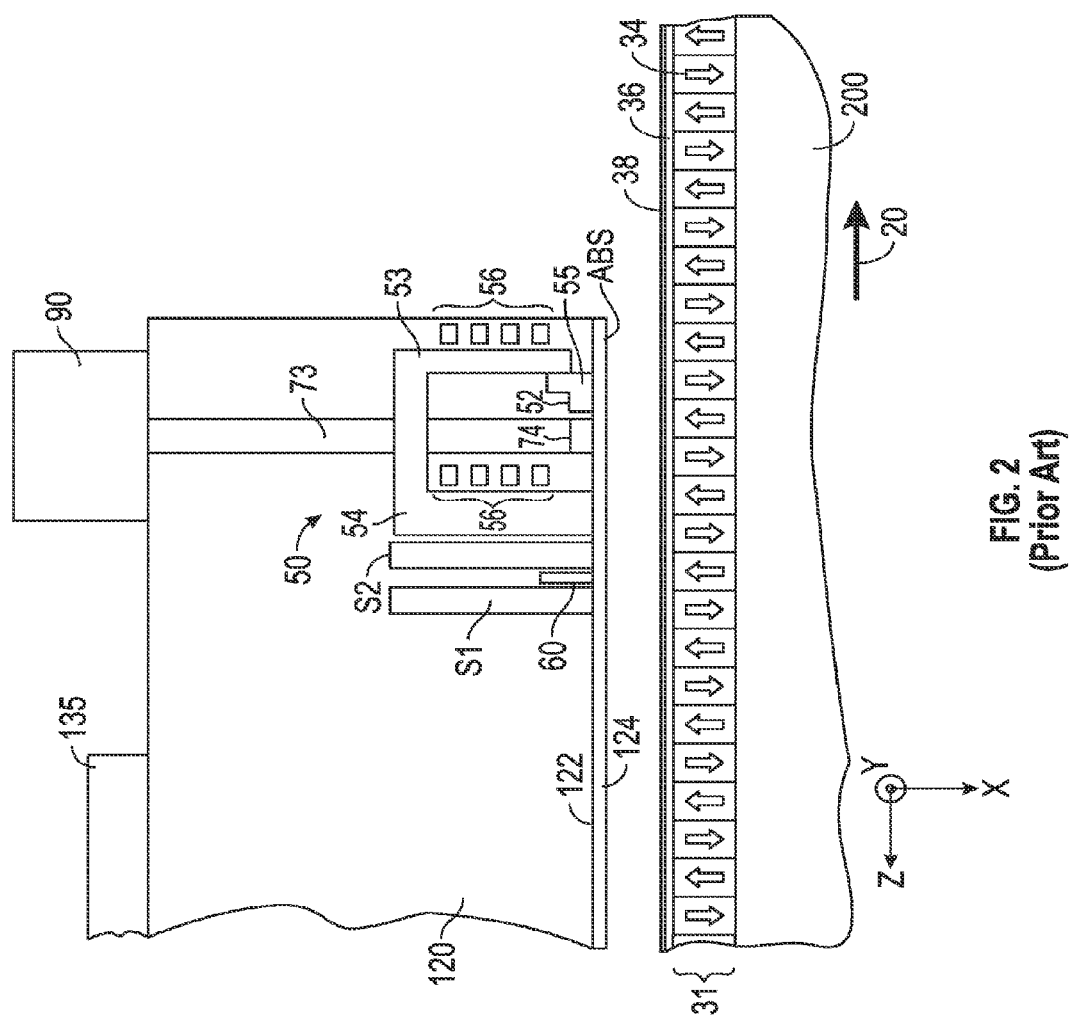
FIG. 2 depicts a sectional view, not drawn to scale because of the difficulty in showing the very small features, of an air-bearing slider for use in HAMR disk drive and a portion of a HAMR disk according to the prior art.

In the following drawings, the X direction denotes a direction perpendicular to the air-bearing surface (ABS) of the slider, the Y direction denotes a track width or cross-track direction, and the Z direction denotes an along-the-track direction. FIG. 2 is a schematic cross-sectional view illustrating a configuration example of a HAMR head according to the prior art. In FIG. 2, the disk 200 is depicted with the recording layer 31 being a conventional continuous magnetic recording layer of magnetizable material with magnetized regions or "bits" 34. The disk includes an overcoat 36, typically formed of amorphous diamond-like carbon (DLC), and a liquid lubricant layer 38, typically perfluoropolyether (PFPE).

The air-bearing slider 120 is supported by suspension 135. The slider 120 has a recording-layer-facing surface 122 onto which an overcoat 124 is deposited. The overcoat 124 is typically a DLC overcoat with a thickness in the range of about 1 to 3 nm and whose outer surface forms the ABS of the slider 120. The slider 120 supports the magnetic write head 50, read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The NFT 74, also known as a plasmonic antenna, typically uses a low-loss metal (e.g., Au, Ag, Al or Cu) shaped in such a way to concentrate surface charge motion at a tip located at the slider ABS when light from the waveguide 73 is incident. Oscillating tip charge creates an intense near-field pattern, heating the recording layer 31. Sometimes, the metal structure of the NFT can create resonant charge motion (surface plasmons) to further increase intensity and heating of the recording layer. At the moment of recording, the recording layer 31 of disk 200 is heated by the optical near-field generated by the NFT 74 and, at the same time, a region or "bit" 34 is magnetized and thus written onto the recording layer 31 by applying a recording magnetic field generated by the write pole end 52.

A semiconductor laser 90 is mounted to the top surface of slider 120. An optical waveguide 73 for guiding light from laser 90 to the NFT 74 is formed inside the slider 120. Materials that ensure a refractive index of the waveguide 73 core material to be greater than a refractive index of the cladding material may be used for the waveguide 73. For example, $Al_2O_3$ may be used as the cladding material and $TiO_2$, $Ta_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide.

In a HAMR disk drive the charge motion in the NFT metal also causes heating of the NFT, and this "self-heating" can reduce the long-term reliability of the NFT, either by causing rounding of the NFT tip or by degrading and oxidizing the DLC overcoat and pole on the slider. The effect of this "self-heating" can be minimized by designing the NFT and disk recording layer for better optical and thermal efficiency so the required optical power is lower. However, as part of the development of this invention, it has been discovered that even with lower optical power, the reliability of the NFT is much worse under actual recording conditions on a disk than under similar self-heating conditions in vacuum, ambient air, or high flying-height. This is believed to be due to accelerated oxidation of the slider DLC overcoat due to the high gas pressure (20 or more atmospheres) generated at the ABS by the high disk rotational speed (5-15 kRPM), or by "back-heating", i.e., heating of the NFT in addition to the normal self-heating, as a result of slider-disk frictional heating, conduction from the disk and/or the accumulation of opaque carbonaceous material near the NFT. Back-heating can cause diffusion of the NFT metal until the NFT tip rounds and recording degrades.

Figure 3:
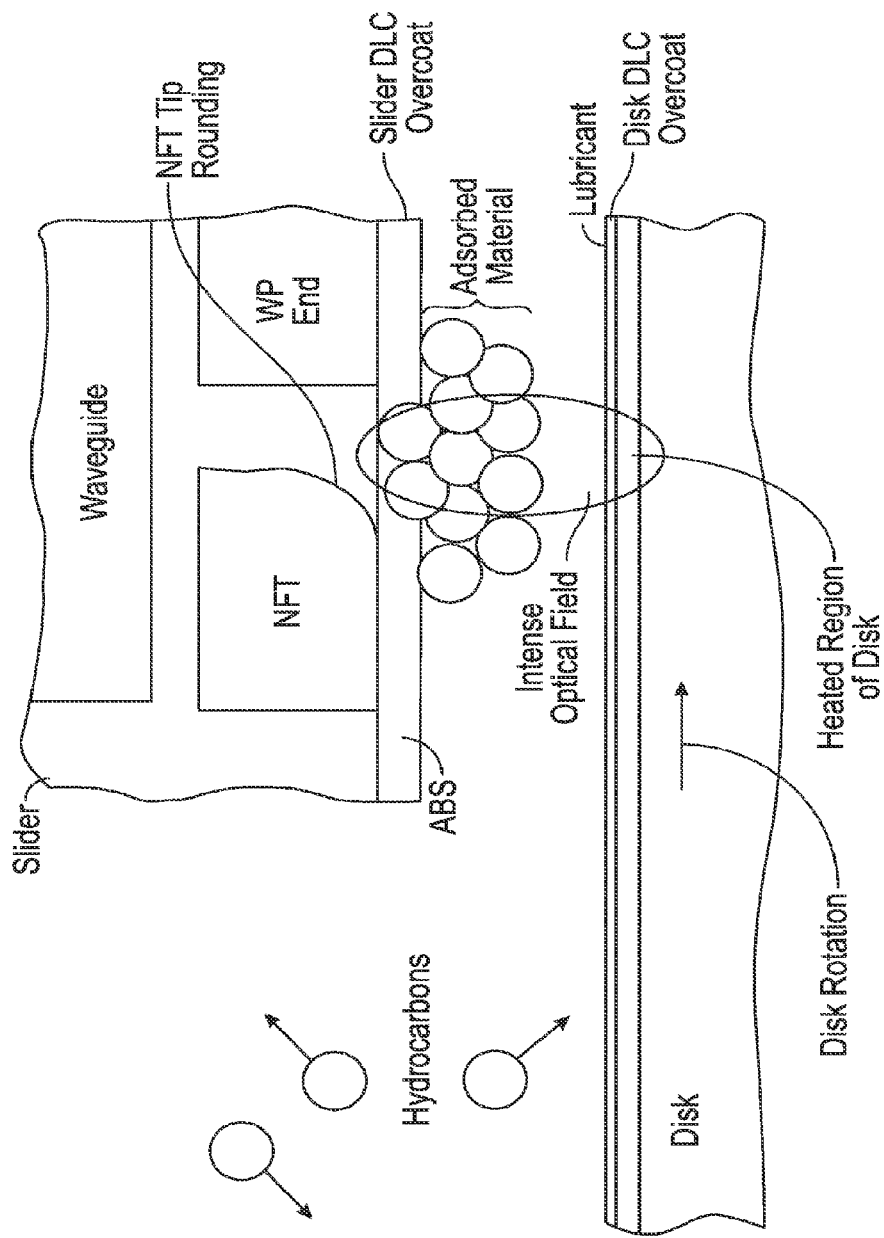
FIG. 3 is a sectional view of portion of the slider with the near-field transducer (NFT) and write pole (WP) end and a portion of the disk with DLC overcoat and lubricant layer, and illustrating a mechanism of accumulation of carbonaceous material.

One possible cause of failure due to back-heating may be due to adsorption of carbonaceous material on the DLC near the NFT. This mechanism is illustrated in FIG. 3, which is a schematic showing a portion of the slider with the NFT, write pole (WP) end and DLC overcoat and the disk with DLC overcoat and lubricant layer. Hydrocarbon and carbon material from the disk overcoat and lubricant and contaminants can adsorb on the slider. If this material absorbs light and is in close proximity to the extremely intense near-field radiation near the NFT, it will heat up and may chemically react. Computer modeling has shown that this material can heat up to the point of combustion if the optical properties of the material are similar to carbon soot. Also, laboratory testing of NFTs to the point of failure have shown the accumulation of amorphous carbonaceous material on the NFT tips. The resulting "back-heating" of the NFT tip due to the accumulation of this material causes diffusion of the NFT metal until the NFT tip rounds and recording degrades.

Embodiments of this invention protect the NFT from "back-heating" with a protective film confined to a window of the disk-facing surface of the slider than surrounds the NFT and write pole end. The protective film is formed of a material different from the material of the slider overcoat and has a thickness preferably between about 1 to 10 nm. The material of the protective film should have the following properties: 1) transparency to radiation at the wavelength of the laser so additional heat is not generated by the film, 2) a high index of refraction (greater than 1.6) to improve near-field coupling between the NFT and recording layer, 3) low thermal conductivity (less than 10 W/mK) to insulate the NFT from "back-heating", and 4) resistance to degradation or corrosion at high temperature and in the presence of oxygen and water. Additionally, in embodiments where the protective film is in direct contact with the NFT metal (typically gold or gold alloy) the material should have good adhesion. Materials for the protective film include, but are not limited to, $TiO_2$, $ZrO_2$, $HfO_2$, $Nb_2O_5$, $Ta_2O_5$, $Sc_2O_3$, $Y_2O_3$, MgO, SiN, BN, SiBN or SiBNC, with the preferred material being one of $TiO_2$, $ZrO_2$, $HfO_2$, or SiBN.

Figure 4A:
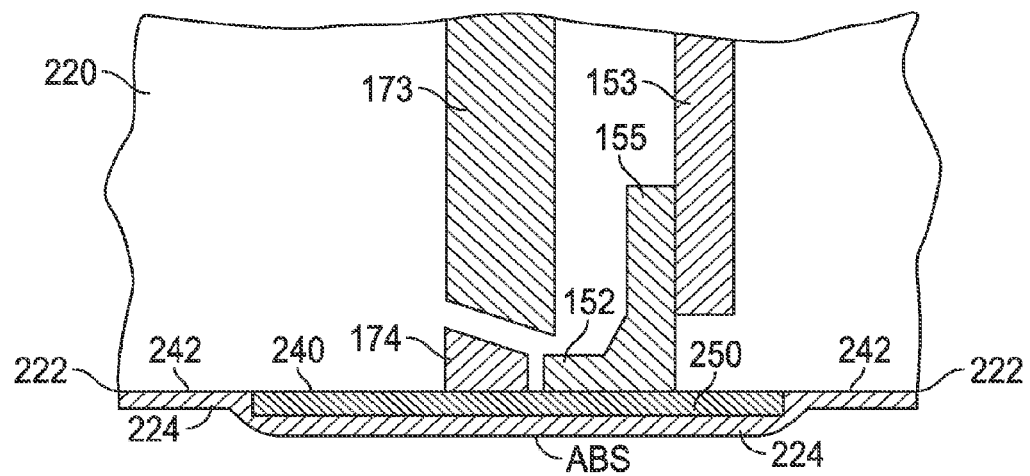
FIG. 4A is a cross-sectional view of a portion of the slider and FIG. 4B is an ABS view of the slider with the protective film on only a window region of the disk-facing surface of the slider according to one embodiment of the invention.
Figure 4B:
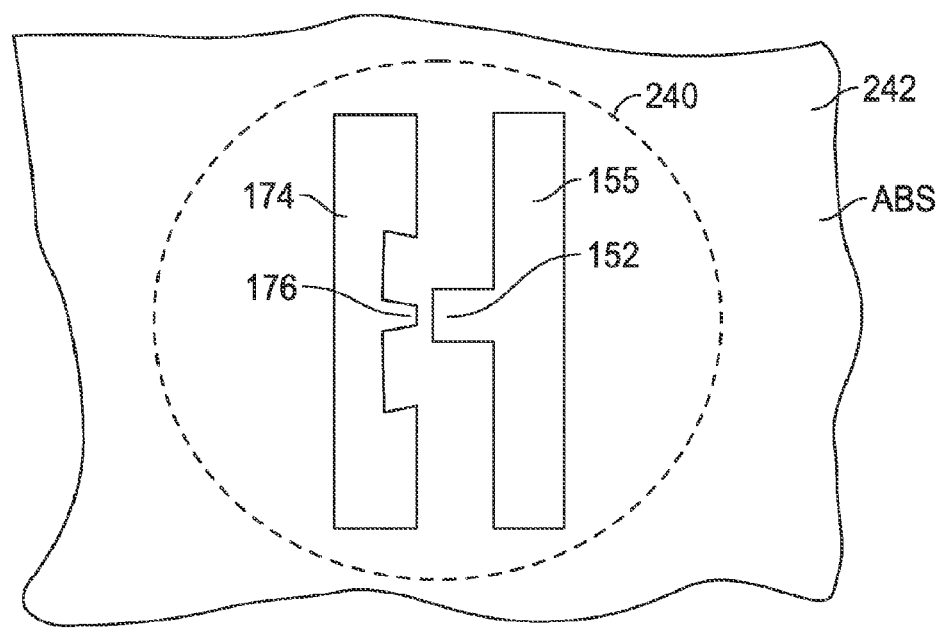

FIG. 4A is a cross-sectional view of a portion of the slider and FIG. 4B is an ABS view of the slider according to one embodiment of the invention. The slider 220 has a surface 222 that faces the recording layer on the disk. The slider supports the waveguide 173, NFT 174, main pole 153 and write pole 155 with write pole end 152. The NFT 174 in this example is an E-antenna with a central tip 176 that faces the write pole end 152 (FIG. 4B). In this example the write pole end 152 is a lip that extends from the write pole 155 at the disk-facing surface 222. The disk-facing surface 222 includes a window region 240 that surrounds both the NFT 174 and write pole end 152. The protective film 250 is located only in the window region 240. In this embodiment the film 250 is directly on the disk-facing surface 222 and is in direct contact with the NFT 174 and write pole end 152. The slider overcoat 224, which is typically DLC but may also include a silicon nitride ($SiN_x$) undercoat, is made of a material different from the material of the protective film and covers both the protective film 250 and the non-window region 242 of surface 222 and has a preferred thickness in the range of 1 to 3 nm. The protective film 250 may be formed by lithographically patterning a resist on the surface 222 to define the window region 240, and then sputter depositing the material of the film 250 into the window region 240, followed by lift off of the resist. The slider overcoat 224 is then sputter deposited over the entire slider surface, including over the film 250, with the outer surface of overcoat 224 forming the ABS. As an alternative to the embodiment of FIG. 4A, the locations of the protective film 250 and overcoat 224 in the window region 240 can be switched. The overcoat 224 can be first sputter deposited over the entire surface 222 directly in contact with NFT 174 and write pole end 152. Then the protective film 250 can be formed on the overcoat 224 by the same previously described lift-off process, but directly on the previously deposited overcoat 224 and only in the window region 240.

Figure 4C:
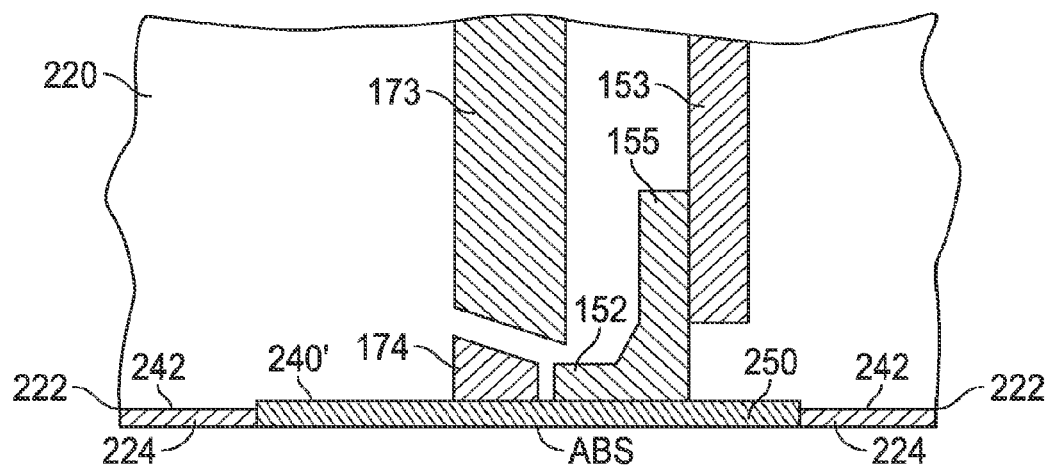
FIG. 4C is a cross-sectional view of a portion of the slider and FIG. 4D is an ABS view of the slider with the protective film located in a recessed window according to an alternative embodiment of the invention.
Figure 4D:
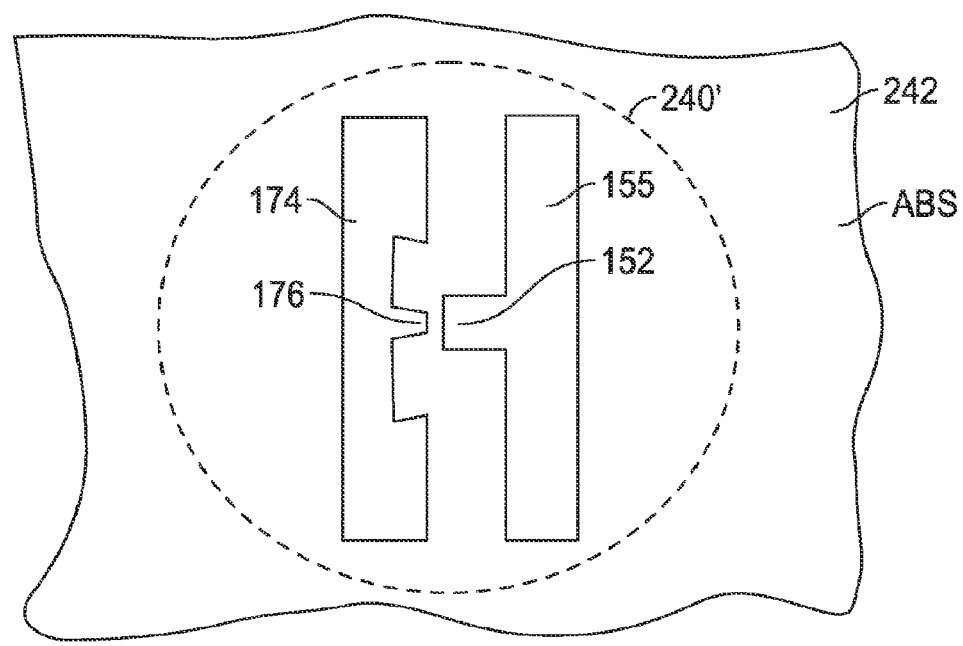

FIGS. 4C-4D illustrate an alternative embodiment where there is a recess in the disk-facing surface 222 that defines a recessed window region 240'. The DLC overcoat is first sputter deposited over the entire surface 222. Then the DLC overcoat is lithographically patterned with resist to define the window region 240'. Ion milling, reactive-ion-etching (RIE) or ashing then removes the DLC overcoat in the window region. The ion milling continues beyond the surface 222 to form the recess. The material of protective film 250 is then deposited into the recessed window region 240' in direct contact with the NFT 174 and write pole end 152. After removal of the resist the surface can be polished prior to sputter deposition of the overcoat 224. This embodiment has the advantage that there is no variation in the topography of the ABS. Additional DLC material may optionally be deposited over the protective film 250 and the DLC overcoat 224 in the non-window region.

Figure 4E:
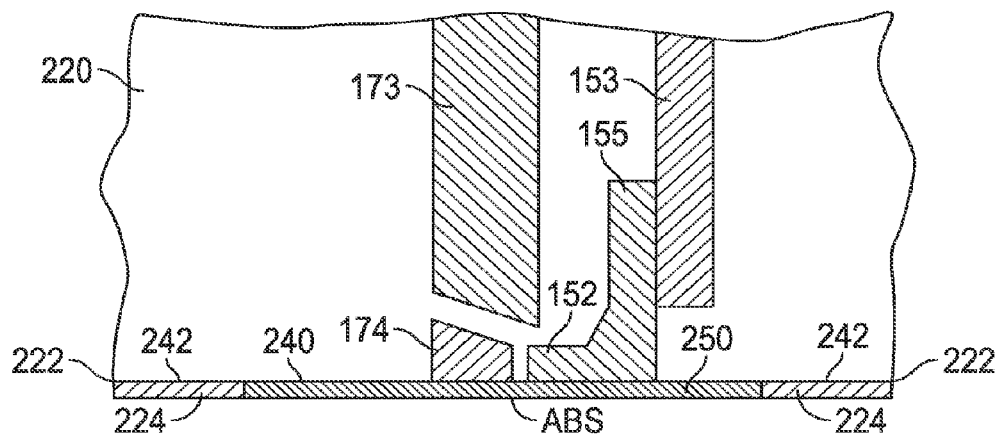
FIG. 4E is a cross-sectional view of a portion of the slider and FIG. 4F is an ABS view of the slider with the protective film located on only a window region and the overcoat located only on the non-window region of the disk-facing surface of the slider according to another embodiment of the invention.
Figure 4F:
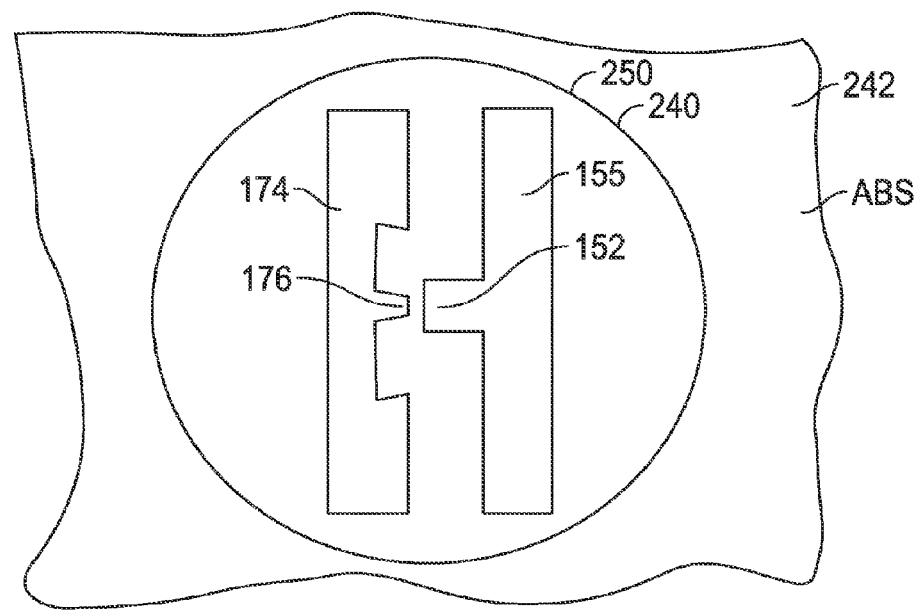

FIGS. 4E-4F illustrate an alternative embodiment where there is no overcoat 224 in the window region 240. In this embodiment, the overcoat 224 is first sputter deposited over the entire surface 222 directly in contact with NFT 174 and write pole end 224. The overcoat 224 is then lithographically patterned with resist to define the window region. The overcoat is then removed in the window region 240 by ion milling, reactive-ion-etching (RIE) or ashing. The protective film 250 is then deposited in the window area 240 in direct contact with the NFT 174 and write pole end 152, followed by lift off of the resist. This embodiment also has the advantage that there is no variation in the topography of the ABS. Additional DLC material may optionally be deposited over the protective film 250 and the DLC overcoat 224 in the non-window region.

Figure 5A:
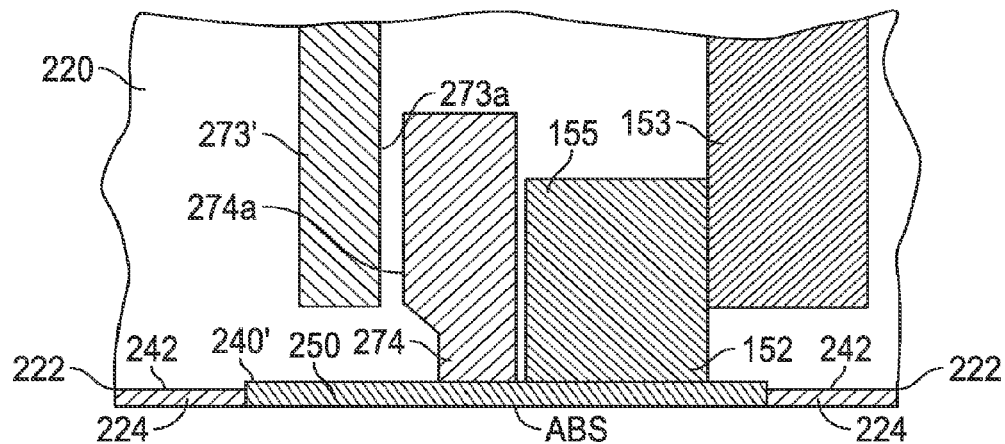
FIG. 5A is a cross-sectional view of a portion of the slider and FIG. 5B is an ABS view of the slider with the protective film on only a window region of the disk-facing surface of the slider according to an embodiment of the invention wherein the NFT is a "nanobeak" type NFT with a triangular end with an apex of the triangle forming the NFT tip that faces the write pole end.
Figure 5B:
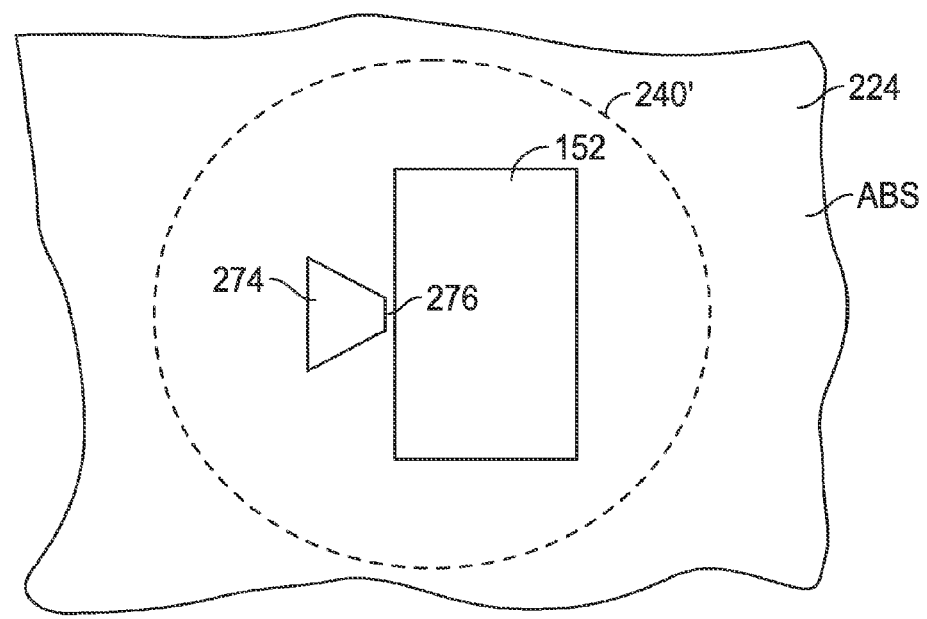

FIGS. 5A-5B illustrate an embodiment wherein the NFT 274 is a "nanobeak" type NFT with a triangular end with an apex of the triangle forming the NFT tip 276 that faces the write pole end 152. In this example, the write pole end 152 does not extend as a lip from the write pole 155. In this type of NFT, the waveguide 273 has a surface 273a that faces a surface 274a of NFT 274. When light is introduced into the waveguide 273, an evanescent wave is generated at the surface 273a and couples to surface plasmons excited on the surface 274a of NFT 274. The surface plasmons propagate to the output tip 276. The nanobeak type of NFT 274 is depicted with the recessed window embodiment of FIGS. 4C-4D, but is also applicable to the other previously described embodiments.

In all of the embodiments, the window is depicted as being circular but could have other shapes, provided it covers both the NFT and write pole end. Preferably the window would not be so large as to also cover the read head (item 60 in FIG. 2). If circular, it could, for example, have a diameter of approximately 2 μm, which would not affect the read head that is typically about 5 μm from the write pole end.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) head for writing to a magnetic recording layer comprising:
   a head carrier having a recording-layer-facing surface;
   a write pole on the head carrier and having an end at the recording-layer-facing surface;
   an optical waveguide on the head carrier for receipt of laser radiation;
   a near-field transducer (NFT) on the head carrier for optical coupling with the waveguide, the NFT having an output end at the recording-layer-facing surface facing the write pole end;
   a protective film on only a window region of the recording-layer-facing surface surrounding the NFT end and write pole end, the protective film being transparent to radiation at the wavelength of the laser; and
   an overcoat on the non-window region of the recording-layer-facing surface comprised of a material different from the material of the protective film.

2. The HAMR head of claim 1 wherein the overcoat is also on the window region of the recording-layer-facing surface NFT.

3. The HAMR head of claim 2 wherein the protective film is directly on the window region of the recording-layer-facing surface and the overcoat is on the protective film.

4. The HAMR head of claim 2 wherein the overcoat is directly on the recording-layer-facing surface and the protective film is on the overcoat.

5. The HAMR head of claim 1 wherein the window region of the recording-layer-facing surface is recessed from the non-window region of the recording-layer-facing surface.

6. The HAMR head of claim 1 wherein the protective film has a thickness greater than or equal to 1 nm and less than or equal to 10 nm.

7. The HAMR head of claim 1 wherein the protective film is formed of a material selected from $TiO_2$, $ZrO_2$, $HfO_2$, $Nb_2O_5$, $Ta_2O_5$, $Sc_2O_3$, $Y_2O_3$, MgO, BN, SiN, SiBN and SiBNC.

8. The HAMR head of claim 1 wherein the material of the protective film has an index of refraction greater than 1.6.

9. The HAMR head of claim 1 wherein the material of the protective film has a thermal conductivity less than 10 W/mK.

10. The HAMR head of claim 1 wherein the NFT end is an E-antenna having a center output tip facing the write pole end.

11. The HAMR head of claim 1 wherein the NFT end is a nanobeak antenna having a generally triangular shaped output tip with an apex of the triangle facing the write pole end.

12. The HAMR head of claim 1 wherein the overcoat comprises amorphous diamond-like carbon (DLC).

13. The HAMR head of claim 1 further comprising a magnetoresistive read head on the head carrier.

14. A heat-assisted magnetic recording (HAMR) disk drive comprising:
   the HAMR head of claim 1;
   a laser for directing light to the waveguide; and
   a magnetic recording disk having a magnetic recording layer.

15. The HAMR disk dive of claim 14 wherein the magnetic recording layer is patterned into generally concentric tracks containing discrete islands of magnetic material.

16. A heat-assisted magnetic recording (HAMR) head for writing to a magnetic recording layer on a magnetic recording disk comprising:
   an air-bearing slider having a disk-facing surface for facing the magnetic recording layer on the disk,
   a write pole on the slider and having an end at the disk-facing surface;
   an optical waveguide on the head carrier for receipt of laser radiation;
   a near-field transducer (NFT) on the head carrier for optical coupling with the waveguide, the NFT having an output tip at the disk-facing surface facing the write pole end;
   a protective film on only a window region of the recording-layer-facing surface surrounding the NFT tip and write pole end and in direct contact with the NFT tip and write pole end, the protective film formed of a material selected from $TiO_2$, $ZrO_2$, $HfO_2$, $Nb_2O_5$, $Ta_2O_5$, $Sc_2O_3$, $Y_2O_3$, MgO, BN, SiN, SiBN and SiBNC; and
   an amorphous diamond-like carbon (DLC) overcoat on the non-window region of the disk-facing surface, the outer surface of the overcoat forming an air-bearing surface (ABS) of the slider.

17. The HAMR head of claim 16 wherein the overcoat is also on the protective film.

18. The HAMR head of claim 16 wherein the window region of the disk-facing surface is recessed from the non-window region of the disk-facing surface.

19. The HAMR head of claim 16 wherein the material of the protective film has an index of refraction greater than 1.6 and a thermal conductivity less than 10 W/mK.

20. The HAMR head of claim 1 wherein the NFT is selected from an E-antenna having a center output tip facing the write pole end and a nanobeak antenna having a generally triangular shaped output tip with an apex of the triangle facing the write pole end.

* * * * *